April 26, 1932.  L. E. GODFRIAUX  1,855,912
HYDRAULIC POWER TRANSMISSION SYSTEM
Original Filed Aug. 1, 1930  8 Sheets-Sheet 1
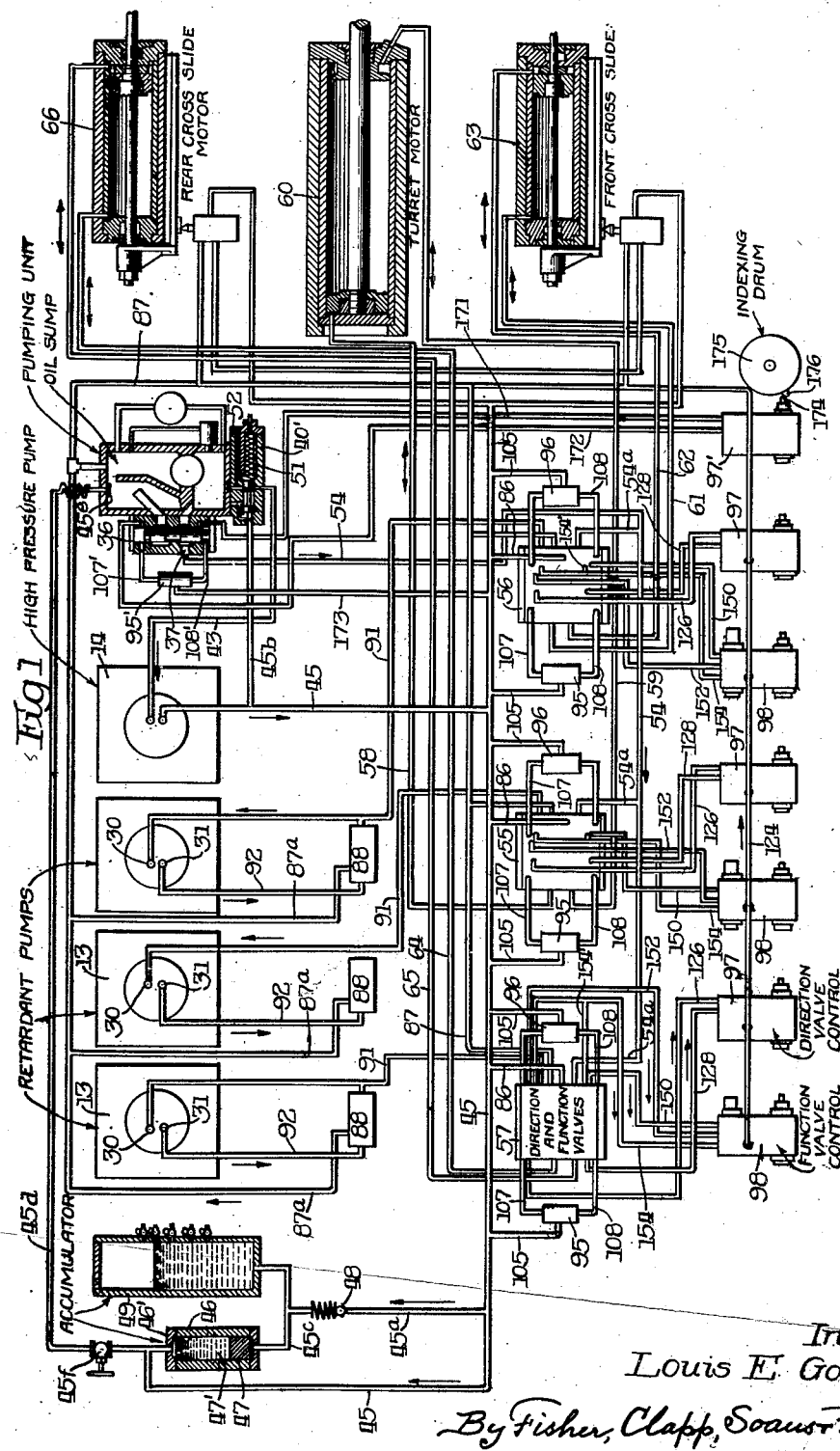
Inventor
Louis E. Godfriaux,
By Fisher, Clapp, Soans & Pond Attys.

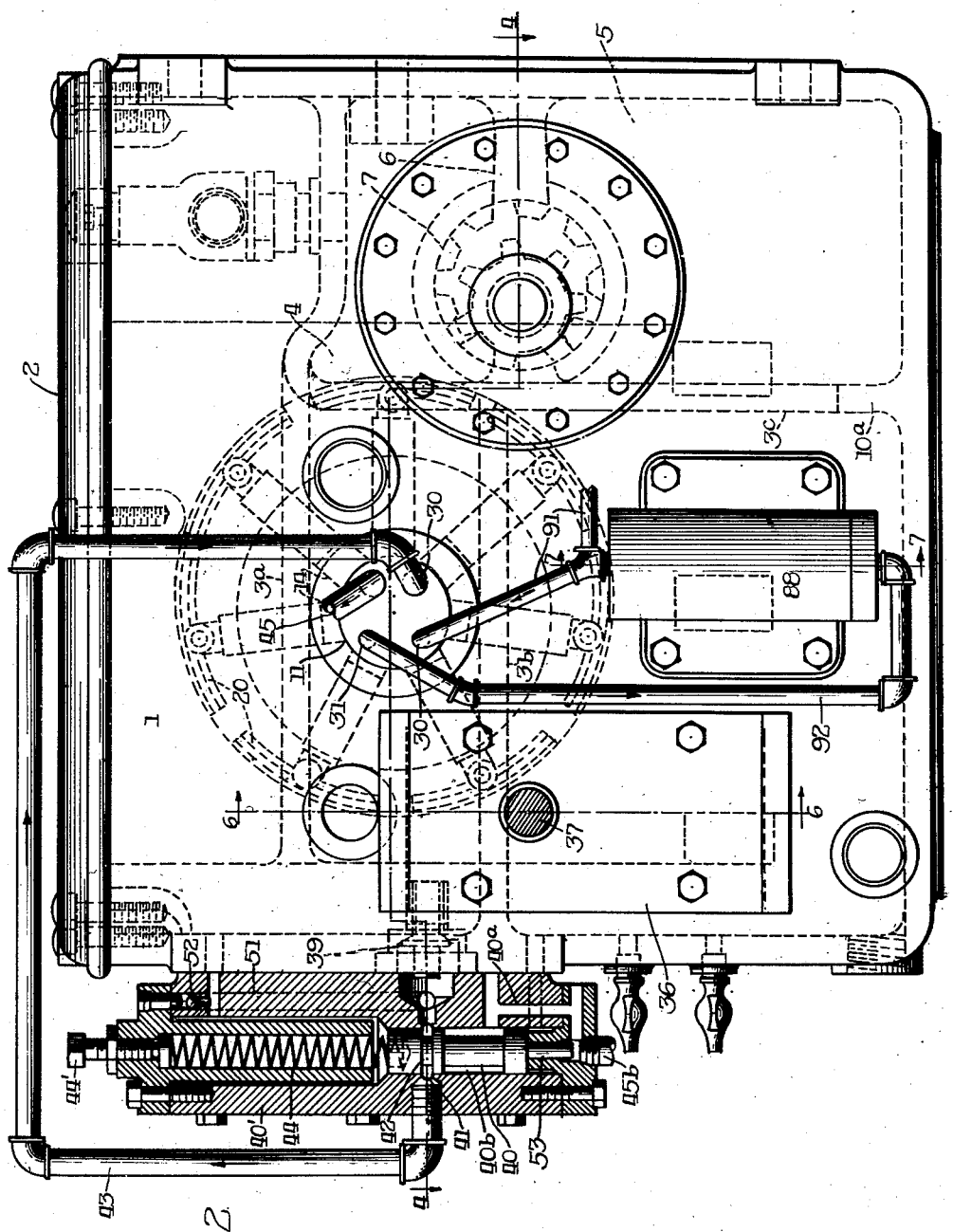

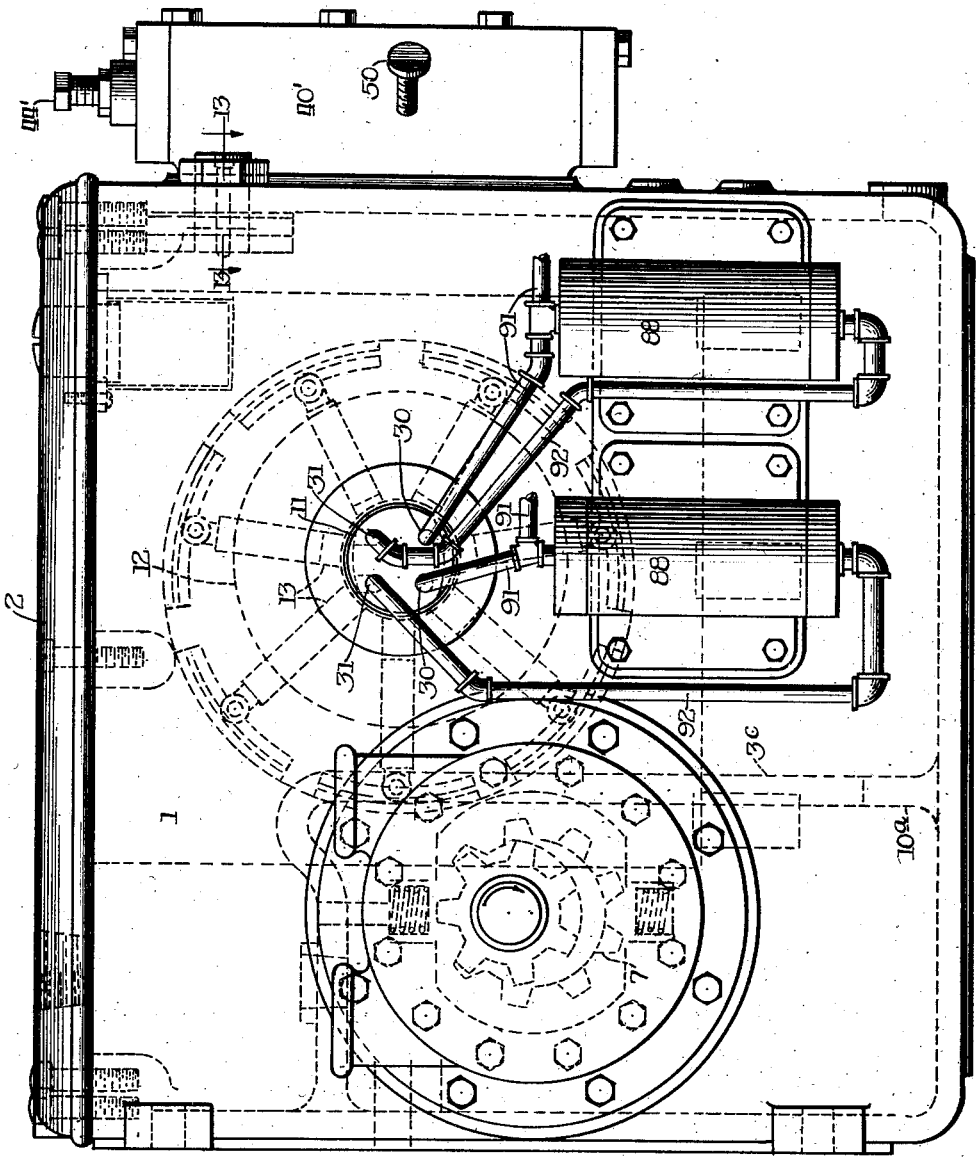

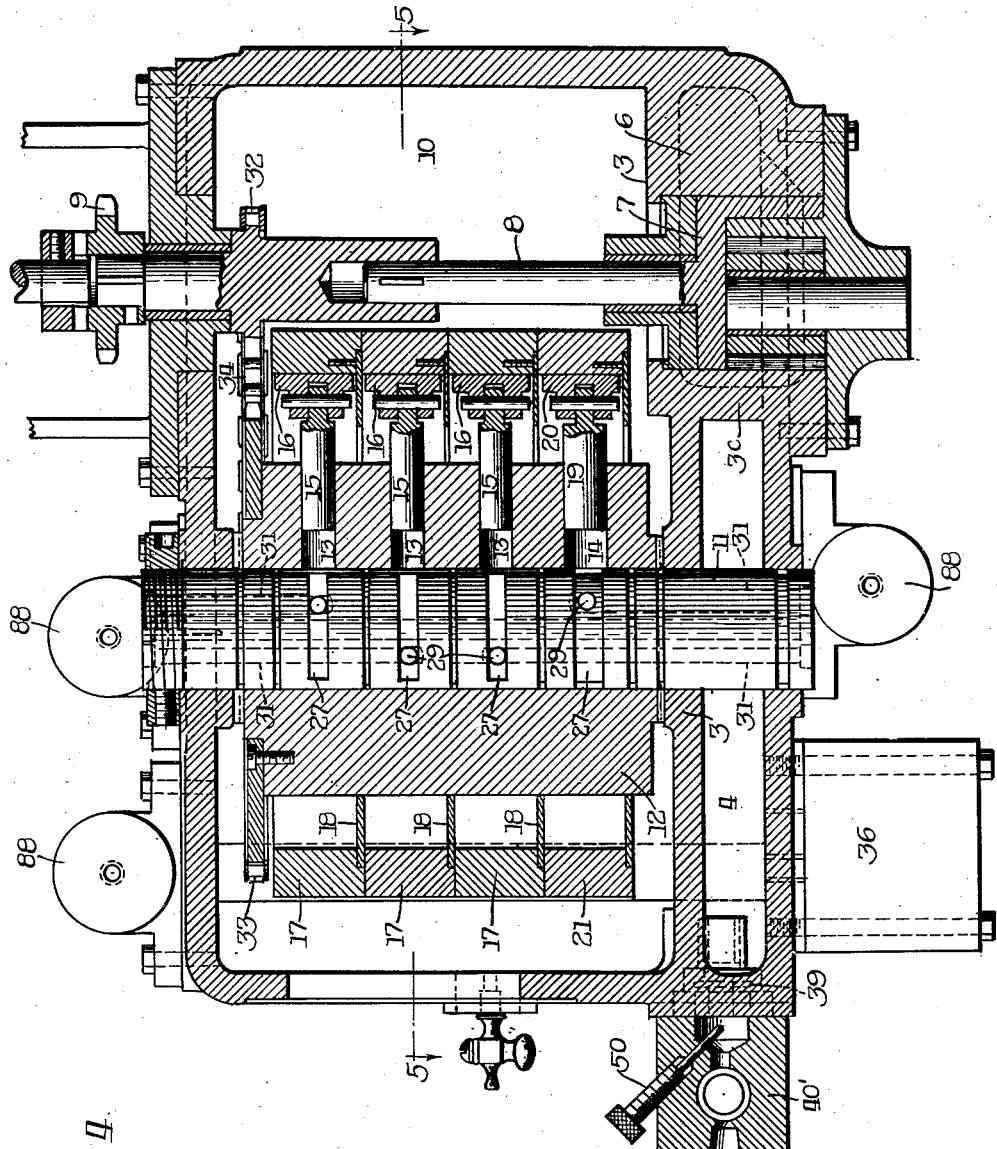

April 26, 1932.   L. E. GODFRIAUX   1,855,912
HYDRAULIC POWER TRANSMISSION SYSTEM
Original Filed Aug. 1, 1930   8 Sheets-Sheet 5
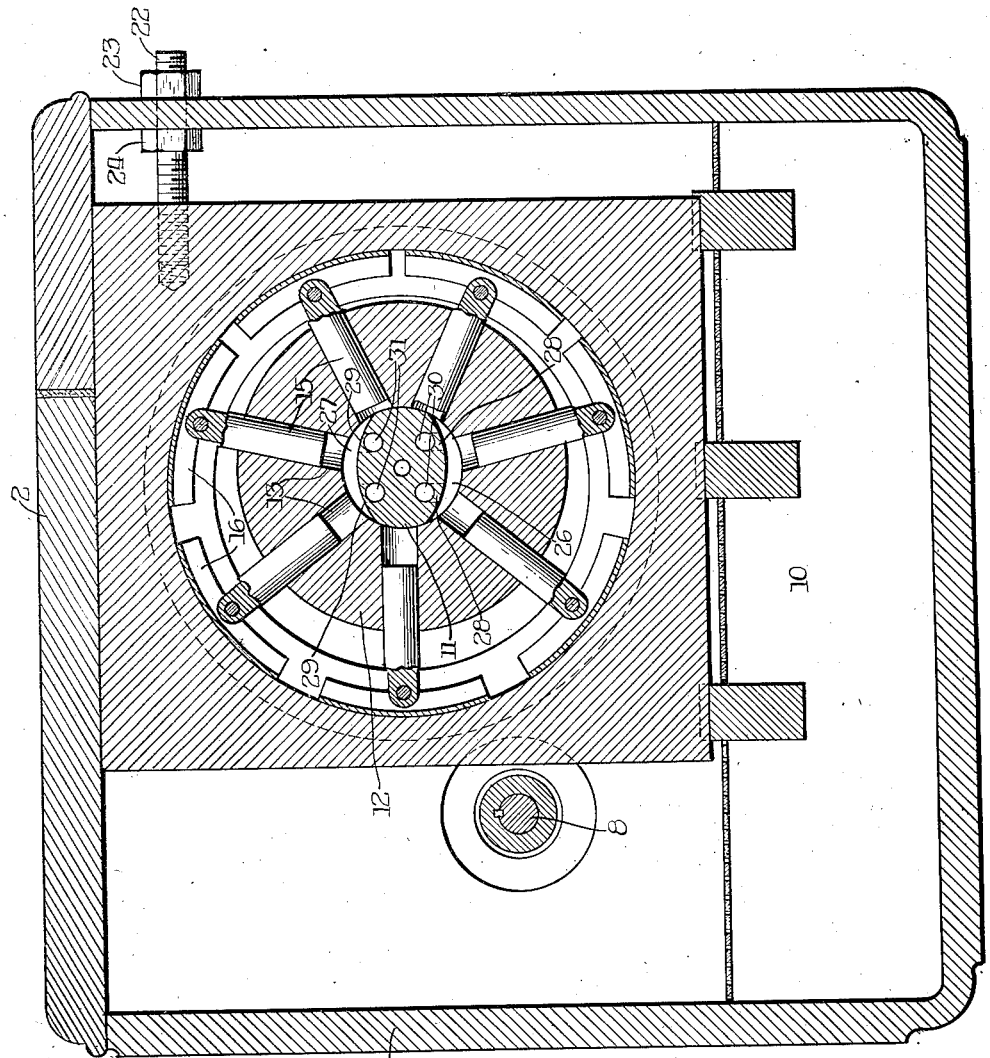
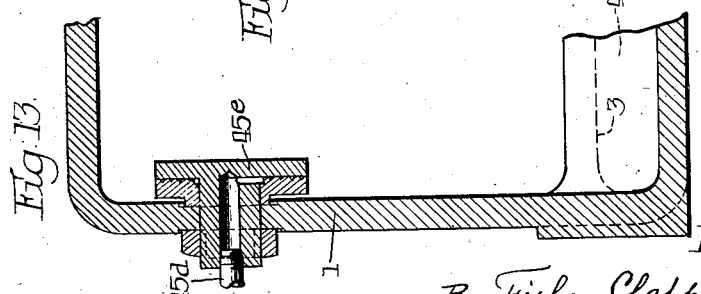
Inventor:
Louis E. Godfriaux,
By Fisher, Clapp, Soans + Pond, Attys

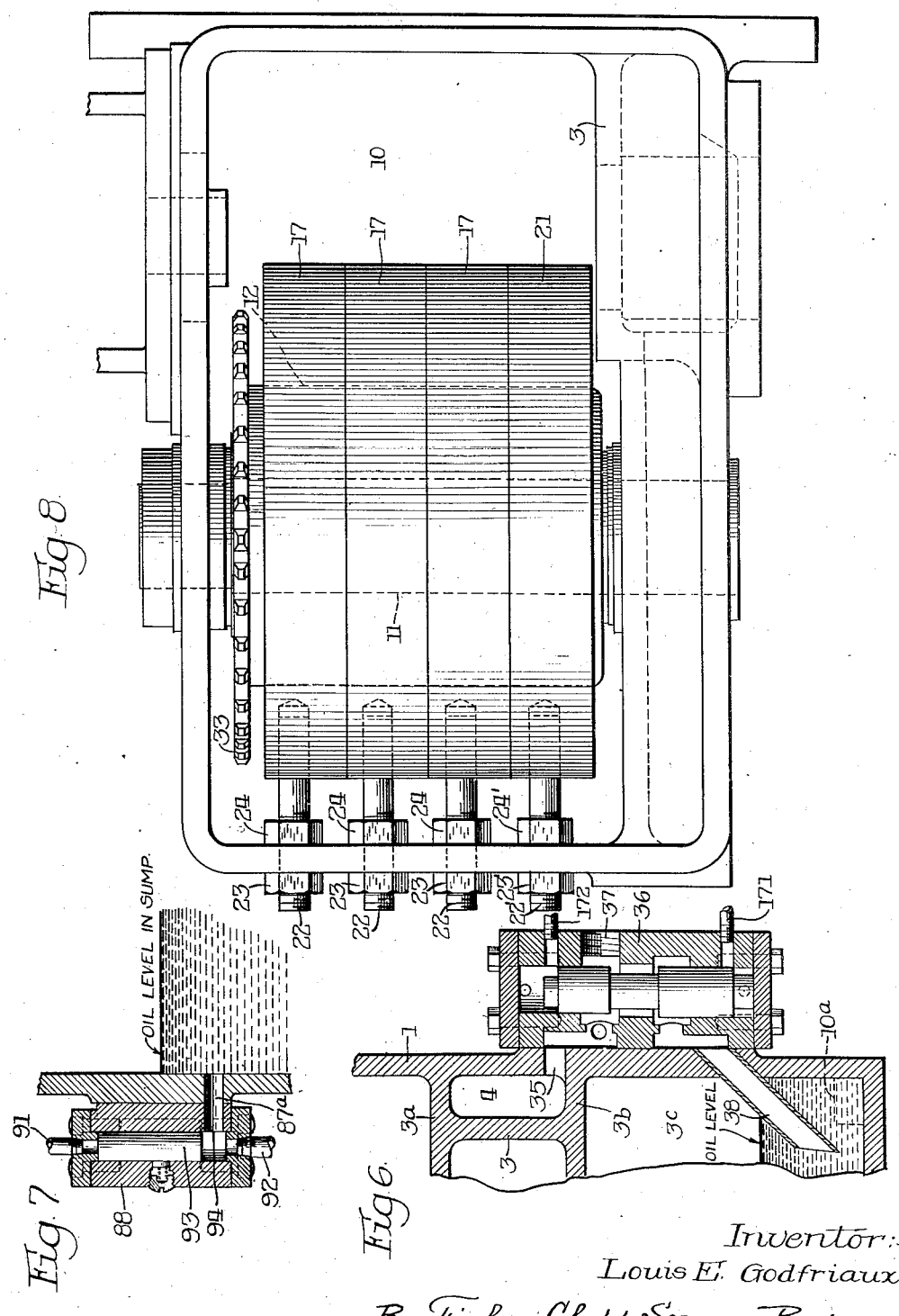

April 26, 1932.   L. E. GODFRIAUX   1,855,912
HYDRAULIC POWER TRANSMISSION SYSTEM
Original Filed Aug. 1, 1930   8 Sheets-Sheet 7
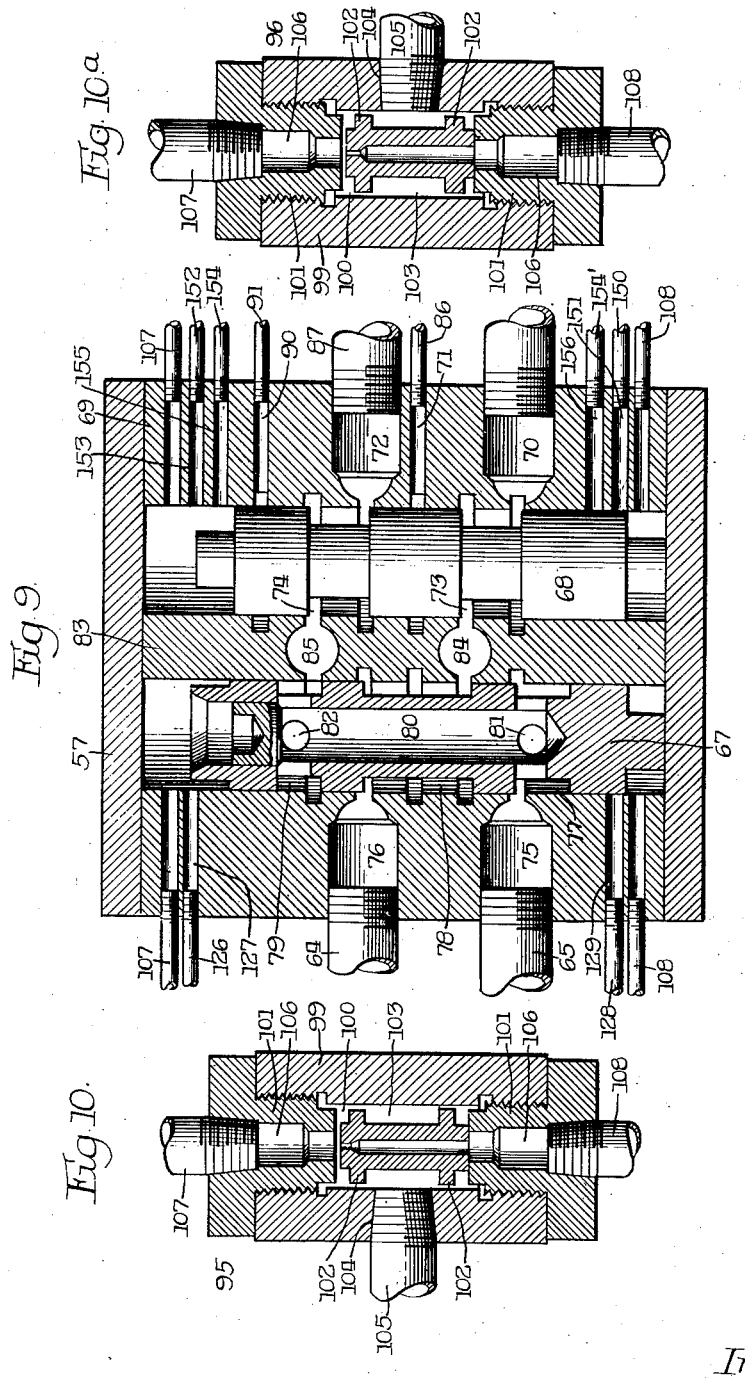
Inventor
Louis E. Godfriaux
By Fisher, Clapp, Soans + Pond, Attys.

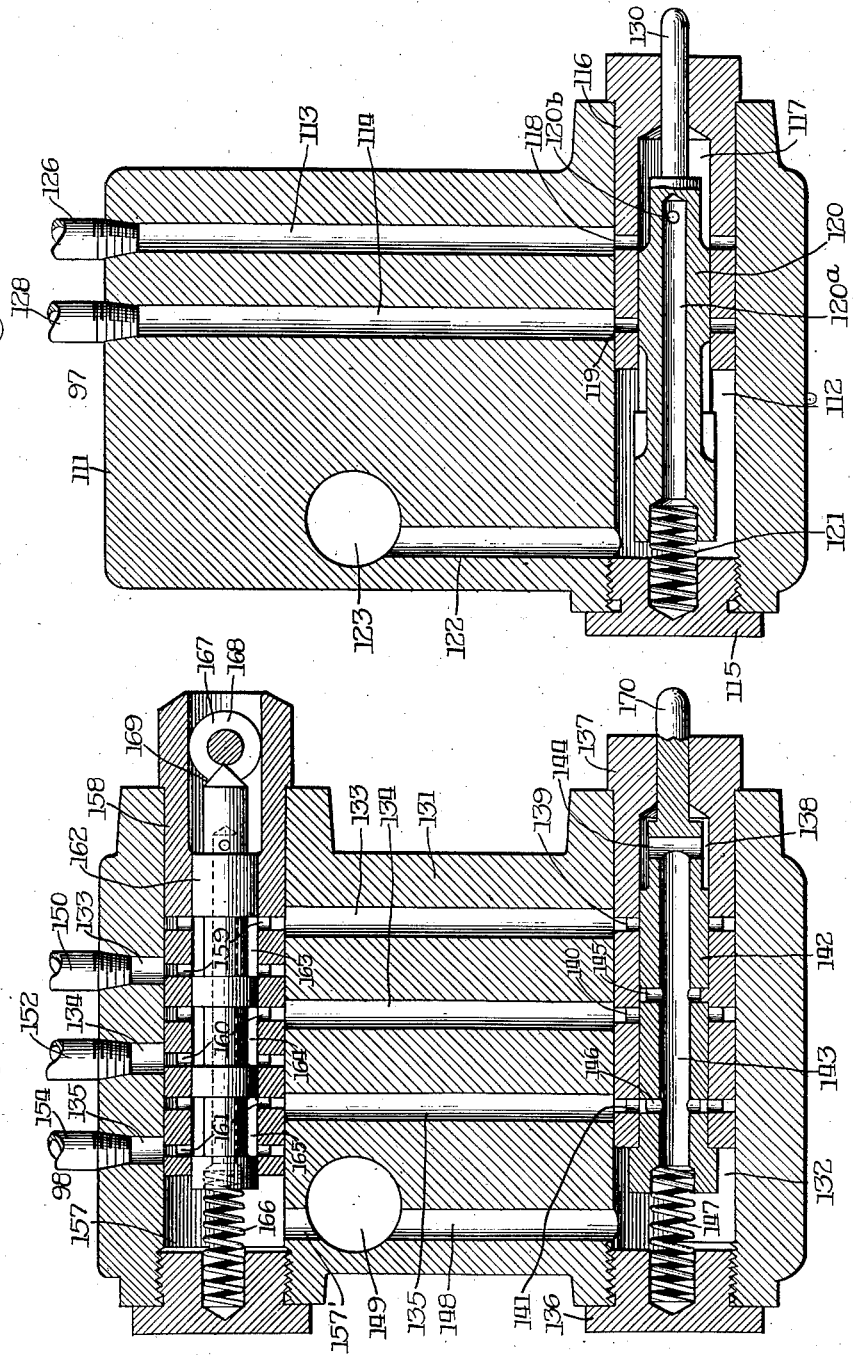

Patented Apr. 26, 1932

1,855,912

UNITED STATES PATENT OFFICE

LOUIS E. GODFRIAUX, OF MADISON, WISCONSIN, ASSIGNOR TO GISHOLT MACHINE COMPANY, OF MADISON, WISCONSIN, A CORPORATION OF WISCONSIN

HYDRAULIC POWER TRANSMISSION SYSTEM

Original application filed August 1, 1930, Serial No. 472,366. Divided and this application filed June 3, 1931. Serial No. 541,752.

Experiments heretofore made in connection with the operation of the various moving parts of a lathe by a fluid, such as oil, under pressure have shown that many difficulties and problems have to be overcome to secure a system wherein approximately the same accurate feed movements are obtainable as can be obtained through the use of mechanical power transmissions. For instance, air bubbles will creep into the body of oil and thus make the latter more or less compressible which creates unevenness in the feed.

Again, in spite of the greatest accuracy and the most perfect fits of the moving parts, some leakage usually occurs, and this also detracts from the accuracy. Quite high pressures have also been required and this increased the tendency to leakage.

Furthermore, where quite a number of parts such as the turret carriage and front and rear cross slides, (traverse and feed movements), chucking mechanism, spindle brake mechanism, spindle speed change mechanism, etc., are all hydraulically operated, and it may be desirable to effect quick movements of some of the parts, such, for example, as a chucking mechanism, an accumulator containing a body of oil under a compressed air or spring pressure is a useful adjunct because effecting an almost instantaneous movement of the oil due to the action of the stored energy in the accumulator, the rapidity of the oil movement being limited only by the capacity of the conduits and valves.

The hydraulic transmission system herein shown and described is designed to meet and overcome the difficulties and objections hereinabove noted. As to the pumping equipment for distributing the oil through the system, the latter preferably employs a connected group of five pumps. The principal pump consists of a low pressure large volume pump of any suitable type for putting the oil under a relatively low pressure suitable for effecting rapid traverse movements of tool carriages. The other four pumps are of the radial cylinder type, all mounted in and caried by a rotor turning on a ported stationary axis or shaft, this latter having longitudinal ducts connected through short radial ducts to intake and outlet chambers communicating with the inner ends of the pump cylinders. One of these pumps, which takes oil from the low pressure pump and raises it to a relatively high pressure for charging the accumulator and furnishing oil for the feed system, is preferably permanently set to pump full volume, although adjustable as to volume; while the other three, which are feed-release pumps functioning as retarding or metering devices during the feeding period, are preferably made independently adjustable.

Since the operation of the system will but be understood through an understanding of the functions and operations of the several pumps making up the pumping unit, I have shown in the drawings and will hereinafter describe such pumping unit, but I do not herein claim the latter as the same forms the subject matter of an application heretofore filed by me on the first day of August, 1930, Serial No. 472,366, of which this application constitutes a divison.

Referring to the accompanying drawings—

Fig. 1 is a diagrammatic view of the system.

Fig. 2 is a side elevation of the pumping unit showing the cut-off valve in vertical section.

Fig. 3 is a side elevation of the pumping unit, viewed from the side opposite that of Fig. 2.

Fig. 4 is a horizontal section through the pumping unit, on the offset line 4—4 of Fig. 2.

Fig. 5 is a vertical section through the pumping unit on line 5—5 of Fig. 4, in the plane of one of the retardant pumps.

Fig. 6 is a vertical section through the by-pass valve for the low pressure large volume pump, on line 6—6 of Fig. 2.

Fig. 7 is a vertical section through one of the feed release pump pressure equalizing valves, on the line 7—7 of Fig. 2.

Fig. 8 is a top plan of the pumping unit, with the cover removed.

Fig. 9 is a longitudinal section through associated direction and function valves.

Figs. 10 and 10ª are longitudinal sections through a pair of identical float valves that control the actuating fluid of the direction and function valves, respectively.

Fig. 11 is a longitudinal section through the function valve control device.

Fig. 12 is a longitudinal section through the direction valve control device.

Fig. 13 is a horizontal section through a portion of the pumping unit casing and air bleeder, on the line 13—13 of Fig. 3.

Describing first the pumping unit, and referring more particularly to Figs. 2 to 5 and 8, 1 may designate a rectangular housing or casing equipped with a removable cover plate 2 and containing an inverted L-shaped vertical partition 3, the top and bottom edges of the horizontal limb of which are connected to the adjacent side wall by walls 3ª and 3ᵇ (Fig. 6), the inner edge of the vertical limb being connected to the side wall by a wall 3ᶜ. This forms between the partition 3 and the adjacent side of the casing a relatively narrow oil traverse chamber 4 and suction chamber 5 separated by a horizontal partition 6 through which extends an internal gear pump, the rotor 7 of which is mounted on and driven by a shaft 8 (Fig. 4), this latter being driven by a sprocket 9 actuated from any suitable source of power. This type of internal gear pump is well known and need not be further herein described.

The lower portion of the casing or housing, with the exception of the suction chamber 5, constitutes an oil sump 10 containing a body of oil. The pump sucks oil from the sump through a port 10ª in the wall 3ᶜ into the suction chamber 5 and delivers it into the traverse chamber 4.

Mounted in and between the opposed side walls of the casing and extending through the partition 3 is a fixed arbor 11, on which is mounted to rotate a barrel 12 formed, in the instance shown, with three radial groups of feed-release or retardant pump cylinders 13 of uniform diameter and a further radial group of booster or accumulator pump cylinders 14 of somewhat larger diameter. Engaged with the cylinders 13 are plungers 15, the outer ends of which are pivotally jointed to arcuate shoes 16 that slidably engage the internal peripheries of a group of circularly apertured plates 17. As shown in Figs. 4 and 8, the plates 17, which are disposed side by side and preferably supplied with interposed washers 18, may be bodily adjusted by screw studs 22 locked in place by nuts 23 and 24 to vary the eccentricity of the axis of the arbor 11 relatively to the circular guiding surfaces of the plunger shoes 16 so as to vary the volume of liquid handled by the pumps. The cylinders 14 are equipped with plungers 19 similarly articulated at their outer ends to shoes 20 sliding over the inner periphery of a circular opening in a similar plate 21 which may be fixed in adjusted position by a similar screw stud 22' and locked in place by nuts 23' and 24'. The arbor 11, in transverse planes coincident with the inner ends of the respective cylinders, is milled down on opposite sides to provide crescent-shaped chambers forming intake and discharge chambers 26 and 27 (Fig. 5), and these chambers in turn communicate through short ports 28 and 29 with longitudinal intake and discharge ducts 30 and 31 extending lengthwise of and through the arbor 11; it being understood that there is an intake duct and a discharge duct for each pumping unit. The pump barrel 12 may be rotated from the shaft 8 by a sprocket 32 on the latter shaft, a large sprocket 33 on the pump barrel and a sprocket chain 34.

The oil delivered by the gear pump flows through the passage 4, and the major portion thereof passes through port 35 (Fig. 6) into the valve chamber of a traverse oil by-pass valve 36 mounted on a side wall of the casing 1, whence it may flow through an outlet port 37 to the motivating cylinders of the turret and cross slides or, when the valve 36 is in the position shown in Fig. 6, the traverse oil is by-passed through a duct 38 back into the sump, at which time the oil flow lines from port 37 to the motivating cylinders of the slides or other moving parts of the machine are closed to the passage of oil therethrough through the agency of a function valve as hereinafter described. The remaining portion of the low pressure oil flows past a check valve 39 into the valve chamber of a cut-off valve 40' mounted on one side of the housing 1, the oil normally flowing through registering annular channels 41 and 42 in the valve casing 40' and valve body 40, (Fig. 2) and thence by a pipe line 43 (Figs. 1 and 2) to the intake duct 30 of the high pressure pump 14; the cut-off valve being normally maintained in the position shown by the thrust of a spring 44, which may be adjusted by a screw 44' to maintain the high pressure oil at the desired operating pressure. Under some circumstances, as when the desired operating pressure of the high pressure oil has been reached, the cut-off valve 40 is shifted so as to admit high pressure oil from a main pipe line 45, above the check valve 39, which, of course, temporarily interrupts the flow of the low pressure oil to the booster pump 14, the high pressure oil reacting through a branch pipe 45ᵇ, raising a plunger 53 which in turn raises the cut-off valve 40 and permits the high pressure oil to flow through a duct 40ª in the valve casing and a recess 40ᵇ in the valve body, against the check valve 39; and at such times the high pressure pump 14 idly circulates oil between its discharge and intake, as will be more fully described later in connection with the diagrammatic view illustrating the distribution.

The low pressure oil passing by route 43 to the intake side of the high pressure pump 14 is boosted in pressure by the latter, and passes from the discharge duct 31 of said pump by the pipe line 45 (see Fig. 1) into the upper end of an accumulator discharge tank 46. Slidable in this tank (which preferably takes the form of a cylinder) is a free plunger or piston 47 which is depressed to the position shown by the pressure of the oil entering the upper end of the tank. As soon as the accumulator discharge cylinder 46 is filled, the oil then flows by a branch line 45$^a$ past a loaded check valve 48 into the lower end of what I term a pressure-supply tank or holder 49. To place the oil in the pressure-supply tank 49 under the desired pressure, the check valve 39 is locked closed by a screw 50 (Figs. 3 and 4), thus cutting off the supply of oil through line 43 to the high pressure pump 14, so that the latter is compelled to pump air, which is drawn in through a duct 51 (Figs. 1 and 2) in the casing of the cut-off valve 40, said duct having a check valve 52 that normally closes it when the check valve 39 is open for the passage of low pressure oil and also when the high pressure oil is admitted against the check valve 39 to hold the latter closed. The pump 14 compresses the air and forces it through the line 45 and 45$^a$ into the accumulator tank 49. When the desired air pressure is reached, the air pressure in line 45 reacts through the branch pipe 45$^b$ (Figs. 1 and 2) raising the plunger 53 which in turn raises the cut-off valve 40, and permits the compressed air to return through the duct 40$^a$ in the valve casing, the recess 40$^b$ in the valve body, and line 43 to the intake side of the pump, thereby preventing any further rise in pressure. As above stated, the same branch pipe 45$^b$ also performs a similar function when high pressure oil is being pumped, which takes place after valve 39 has been released by backing off locking screw 50.

The line 45$^c$ beyond the loaded check valve 48 connects accumulator discharge cylinder 46 to accumulator tank 49, whereby to raise the plunger 47 and force the oil thereabove into the high pressure distribution system at times when an abnormal demand may exceed the capacity of the high pressure pump.

As explaining the preferred use of an accumulator comprising the two tanks 46 and 49, it was found by experiment that when one tank only was used it had a tendency to become "oil-logged". In other words, the oil seemed to absorb the air in the tank and thus permit the tank to be filled with oil. When this condition is approached or reached the benefit of having an accumulator is lost. By introducing the accumulator discharge cylinder 46, with its plunger 47, the oil which is in the pressure-supply tank 49 is prevented from ever getting into circulation, and after the oil in this pressure-supply tank 49 has absorbed a certain amount of air, it will become saturated and cease absorbing more air. The discharge cylinder 46 has a further object, namely, to prevent the pressure-supply tank 49 from draining itself, due to leakage in the system, during periods of non-operation. As a further means of preventing leaks, I may employ a soft copper gasket 46' in the head of cylinder 46, into which a sharp edge 47' of the plunger 47 embeds itself when the plunger is all the way up, since some oil from the tank 49 tends to leak upwardly around plunger 47.

Connected into line 45, which leads into the upper end of the accumulator discharge cylinder 46, is a line 45$^d$ which leads into an air bleeder valve 45$^e$ (Fig. 13) mounted in a side wall of the casing 1 of the pumping unit. The purpose of this air bleeder is to free the system of air that gets into the oil, and at the same time prevent any serious amount of oil escaping, the principle being that air will escape quite freely through a fine passage, while oil, due to its viscosity, will flow comparatively slowly and in an amount not enough to seriously drain the system. In the air bleeder line 45$^d$ is a cock 45$^f$ (Fig. 1) which, of course, is closed when charging the pressure-supply tank 49 with compressed air, and is left open when the system is operating. With the structural details of this air bleeder the present invention is not concerned, since any device presenting a long fine flow passage, such as that shown in Fig. 13 may be employed.

The low pressure oil used for effecting traverse movements of the tool carriages flows past the traverse oil by-pass valve 36 and is conducted by a pipe line 54 (Fig. 1) and branches 54$^a$ to and through three valve systems, which respectively control the function and direction of the motivating cylinders of the turret and front and rear cross slides. In the diagram Fig. 1, the valve system pertaining to the turret is designated as an entirety by 55, that pertaining to the front cross slide by 56, and that pertaining to the rear cross slide by 57.

From the discharge side of the turret valve system 55 the oil flows alternately by lines 58 and 59 into the opposite ends of the turret motivating cylinder 60, low pressure oil flowing first to effect the traverse movement, and this being followed by the high pressure of feed oil; the discharge from the cylinder returning through the other line. From the discharge side of the front cross slide system 56 the low pressure oil followed by the high pressure oil flows alternately by lines 61 and 62 into the opposite ends of the front cross slide motivating cylinder 63, the discharge from the cylinder returning alternately by the same lines; and from the discharge side of the rear cross slide valve system 57 the low pressure oil followed by the high pressure oil flows alternately by lines 64 and 65 into the opposite ends of the rear cross slide motivating cylinder 66; the discharge from the cylinder returning alternately by the same lines.

Referring to Fig. 9, each of the valve systems 55, 56 and 57 comprises a pair of plunger valves 67 and 68, slidably mounted in a casing 69, of which the valve 67 is a direction valve having two positions; that is to say, a valve which admits oil to either end of a cylinder and simultaneously discharges it from the opposite end, and the valve 68 is a function valve having three positions, in one of which it passes low pressure or traverse oil, in another high pressure or feed oil, and in the third, is neutral, passing no oil. When in a position to pass high pressure oil, it also passes feed release oil from one end of the motor cylinder to the intake side of the feed release or retardant pump.

Describing this valve system somewhat more in detail, the cylinder containing function valve 68 is formed with a low pressure oil intake port 70, a high pressure oil intake port 71, an oil return port 72, and a feed release port 90. The valve itself, which is of the plunger type, has lower and upper annular recesses 73 and 74. The cylinder containing the direction valve 67 has lower and upper ports 75 and 76, which alternately pass oil to the slide motivating cylinder and return oil therefrom. The valve 67 is formed with lower, intermediate and upper annular recesses 77, 78 and 79 respectively, and an internal longitudinal flow passage 80 communicating with the recesses 77 and 79 through ports 81 and 82. The wall 83 dividing the two valve cylinders is formed with transverse ducts 84 and 85, adapted to communicate on one side with the annular recesses 73 and 74 respectively of the valve 68; the duct 84 being adapted to communicate on the other side with the annular recesses 77 and 78 of the valve 67, and the duct 85 with the annular recesses 79 and 78 of the valve 67. Into the high pressure oil inlet port 71 leads a branch pipe 86 from the high pressure oil delivery line 45. In the positions of the valves shown, low pressure oil is flowing from the port 70 across the two valves through recess 73, duct 84 and recess 78 out through port 76 and line 64 to one end of rear cross-slide cylinder 66, and return oil from the opposite end of said cylinder is flowing back through line 65 and port 75, across the two valves through recess 77, port 81, passage 80, port 82, recess 79, duct 85, and recess 74 out of port 72 into a return line 87 leading into the sump 10 (Fig. 1). When the direction valve 67 is shifted to its other position, the direction of flow is reversed, the oil flowing to the slide cylinder passing out of the valve at port 75 and thence through line 65, and the return oil flowing through pipe 64 into port 76. In both positions of the valve 67. with the function valve 68 in the position shown, the return flow to the sump is through the port 72 and line 87.

When the high pressure oil feed is tripped in by means hereinafter described, the function valve 68 is shifted to its extreme opposite position from that shown. This shuts off the low pressure oil inflow port 70 and sump return port 72 and opens high pressure oil intake port 71, permitting high pressure oil to flow through the valve system and into either line 64 or 65 depending on the position of direction valve 67. This shifting of the function valve 68 opens the port 90 in the cylinder containing the function valve 68, throwing said port into communication with the annular recess 74 of the valve, and thus causing the feed release oil to flow through a line 91 to the inflow duct 30 in the pump arbor 11 and thence to the intake side of one of the feed release or retardant pumps 13, from which latter the feed release oil is discharged through arbor duct 31 and a line 92 into an equalizing valve 88, preferably mounted on a side wall of casing 1 (Figs. 2, 3 and 4) and thence to the sump by line 87$^a$. As shown in Fig. 7, the discharge line 87$^a$ enters the sump at a point below the oil level in the latter, which prevents the formation of air bubbles in the oil.

Describing at this point the function of the equalizing valve 88, it may be remarked that, since the feed release oil on the intake side of the pump 13 is under a pressure substantially equal to the cylinder operating pressure less the resistance pressure of the work, while the discharge from said pump into the sump is practically at zero pressure, there would exist a considerable liability of leakage from the intake chamber 26 to the discharge chamber 27. The equalizing valve, shown in section in Fig. 7, comprises the casing 88 and a sliding plunger 93 therein which at one end is adapted to over-run a port 94 leading to the sump. One end of the plunger 93 is in communication with the feed release line 91, and the other end with the feed discharge line 92. The superior pressure in the feed release line 91 shifts the plunger 93 to a position wherein it cuts off the sump port 94 until the pressure has been built up in the discharge line 92 to a point where the plunger 93 is shifted back to slightly uncover the sump discharge port 94; the plunger 93 being balanced when the opening through the sump port 94 is sufficiently constricted to substantially equalize the pressures in lines 91 and 92. As stated this substantially equalizes the pressures in the intake and discharge chambers of the pump and thus prevents leakage between said chambers with consequent loss of pressure on the intake side, the object of this device being to prevent any uncontrolled or variable feed of the slide.

When function valve 68 is in its intermediate position all four of the ports 70, 71, 72 and 90 are cut off, and there is no flow of oil through the valve system in either direction.

Each of the valve systems 55, 56 and 57 is controlled as to the movements of its direction and function valves by automatic float valves 95 and 96, respectively, which are structurally identical, and the details of which are illustrated in Figs. 10 and 10ª; and the operations of the float valves 95 and 96 are in turn, respectively, controlled by a direction valve control device 97 and a function valve control device 98. Referring to Figs. 10 and 10ª, the detail structure of this float valve comprises a casing 99 formed with a cylindrical valve chamber 100 closed at its ends by plugs 101. In the valve chamber 100 is a floating plunger valve formed with circular heads 102 and an intermediate annular recess 103. The casing 99 is formed with a central lateral intake port 104 that communicates at all times with the recess 103 and is connected to the main high pressure oil line 45 by a pipe line 105; and the plugs 101 are formed with axial ports 106 that are connected by pipe lines 107 and 108 to the opposite ends, respectively, of the chambers containing the direction and function valves. The heads 102 of the float valve do not have a sliding fit in the valve chamber 103, but between said heads and the wall of the chamber there is a substantial clearance, permitting oil to flow past the heads. If, now, flow of oil through the line 108 is stopped at a point beyond line 108, and flow of oil through the line 107 is open at a point beyond line 107, the rush of oil past the restrictive clearance between the upper head 102 of the float valve and the wall of chamber 103 will carry the float valve with such flow against the face of plug 101, stopping the flow of oil in pipe 107. The pressure difference then existing in lines 105 and 107 will retain the float valve in this position as long as line 107 is open. In this position of the float valve, the lower port 106 is opened, so that oil may flow through the line 108 in the lower end of the main valve 67 or 68, thus causing said valve to shift to its opposite extreme position. Similarly, if the flow through line 107 be stopped at a point beyond said line, and the flow through line 108 be opened at a point beyond said line, the valve shifts in the opposite direction, to the position shown in Figs. 10 and 10ª, thus shutting off the flow through line 108 and opening the flow through line 107.

As shown in Fig. 9, the float valve delivery lines 107 and 108 lead into the end portions of the chambers of the direction and function valves 67 and 68 and are at no times closed by said valves. The alternate venting of the ends of said valve chambers, so as to effect a shift of the valves by pressure at the opposite ends, is in an automatic system, effected by the direction and function valve controls 97 and 98, which latter are automatically actuated by dogs on a rotating control drum. Describing the direction valve control 97, and referring to Fig. 12, this consists of a block 111 formed with a transverse valve chamber 112, and with longitudinal ducts 113 and 114 leading laterally into the valve chamber 112. The valve chamber 112 is closed at its ends by plugs 115 and 116, the latter of which is formed with an axial bore 117 and with lateral ports 118 and 119 registering with the inner ends of the ducts 113 and 114, respectively. Slidable in the bore 117 of the plug 116 is a plunger valve 120 adapted, in one position, to cover port 119 and uncover port 118, and in the other position to cover port 118 and uncover port 119. This valve is normally maintained in a position to cover port 118 and uncover port 119 by a thrust spring 121 seated in the plug 115 and bearing against the end of the valve 120; this being the position of the valve which effects back traverse of the carriage controlled thereby. The valve 120 is formed with a longitudinal duct 120ª and lateral port 120ᵇ to permit exhaust from port 118 into valve chamber 112. A duct 122 leads from one end of the valve chamber 112 to a discharge port 123 in the block 111, and the port 123 is connected to a flow line 124 (Fig. 1) serving all of the valve control units, which flow line 124 connects into the flow line 87 delivering into the oil-pump sump 10. The duct 113 is connected by a pipe line 126 (Fig. 1) and port 127 (Fig. 9) into the upper end of the chamber of the direction valve 67 and functions in effecting a movement of valve 67 to secure forward traverse or feed of a tool carriage, while the duct 114 is connected by a pipe line 128 and port 129 into the lower end of the chamber of direction valve 67, and functions in effecting a movement of valve 67 to secure back traverse or feed of a tool carriage. In the normal position of valve 120 under the thrust of spring 121, the forward traverse line 126 is closed at port 118 and back traverse line 128 is open at port 119 to the return line to the sump. On one end of the valve 120 is a stem or pin 130 disposed in the path of a dog on a rotatable control drum as hereinafter described.

With the valve 120 in the position to which it has been pushed by the spring 121, the forward traverse and feed line 126 is closed by the valve, and the back traverse line 128 is vented to the sump. This releases the pressure beneath valve 67 and automatically causes the float valve pertaining to valve 67 to pass high pressure oil into the upper end of the chamber of valve 67, thus depressing said valve until it closes port 129 and line 128, and opens the passage past the valve for oil to one end of the motor cylinder of a carriage by which, in the arrangement shown, backward traverse of the carriage is effected. When the valve stem 130 is struck to shift the valve and open line 126 and close line 128, the oil above valve 67 is vented to the sump, and the float valve shifts the direction of flow of pressure oil into the lower end of the chamber of valve 67, thereby raising the latter valve until it closes port 127 and line 126, and directs the flow of oil to the other end of the slide motor cylinder so as to effect forward traverse and feed of the carriage.

Describing the function valve control 98, and referring to Fig. 11, this consists of a block 131 formed with a transverse valve chamber 132, and with longitudinal ducts 133, 134 and 135 leading laterally into the valve chamber 132. The valve chamber 132 is closed at its ends by plugs 136 and 137, the latter of which is formed with an axial bore 138 and with three lateral ports 139, 140 and 141 registering respectively with the inner ends of the ducts, 133, 134 and 135. Slidable in the bore 138 of the plug 137 is a plunger valve 142 formed with a longitudinal duct 143 and with transverse ducts 144, 145 and 146 all communicating with longitudinal duct 143 and adapted to register respectively with the ports 139, 140 and 141. In one extreme position of the valve 142, shown in Fig. 11, port 141 registers with duct 146, while ports 140 and 139 are covered. In the other extreme position of the valve, port 139 registers with duct 144, while ports 140 and 141 are covered. In an intermediate position of the valve, port 140 registers with duct 145 and ports 139 and 141 are covered. Valve 142 is normally maintained in a position to cover ports 140 and 139 and uncover port 141 by a thrust spring 147 seated in the plug 136 and bearing against the end of the valve 142. This maintains function valve 68 in intermediate or neutral position, wherein the traverse and feed ports are both closed. A duct 148 leads from one end of the valve chamber 132 to a discharge port 149 in the block 131, and the port 149 is connected to the flow line 124 leading to the oil pump sump. The duct 133 is connected by a pipe line 150 and port 151 (Fig. 9) into the lower end of the chamber of the function valve 68 and functions in effecting a movement of valve 68 to secure a traverse movement of the tool carriage. The duct 134 is connected by a pipe line 152 and port 153 (Fig. 9) into the upper end of chamber of function valve 68, and functions in effecting a movement of valve 68 to secure a feed movement of a tool carriage. The duct 135 is connected by a pipe line 154 and branch 154' (Fig. 9) into the upper and lower ends of the chamber of function valve 68 through ports 155 and 156, and functions in effecting a movement of valve 68 to an intermediate position wherein all the supply ports controlled by valve 68 are covered.

In the upper part of the function control valve block 98 I have shown an optional manually operated emergency device by which the traverse, feed and neutral lines 150, 152, 154 and 154' may all be closed so as to arrest the movement of a carriage at any instant. This consists simply of a transverse valve chamber 157 intersecting the ducts 133, 134 and 135, in which is fitted a sleeve 158 formed with radial ports 159, 160 and 161 normally registering with the ducts 133, 134 and 135 and their respective flow lines 150, 152 and 154. Slidable within the sleeve 158 is a plunger valve 162 formed with annular recesses 163, 164 and 165 normally registering with the ports 159, 160 and 161 respectively, under the thrust of a spring 166, thus maintaining all of the flow lines 150, 152 and 154 leading to the function control valve 142 open. By means of a cam 167 on a push or pull rod 168 cooperating with a cam 169 on the end of valve 162, said valve may be shifted to close flow lines 150, 152 and open 154 into chamber 157 and thence through port 157' into sump return duct 149, thus bringing valve 68 to its central or neutral position.

Briefly describing the operation of the function valve control device 98, the spring 147 normally maintains this valve in the position shown in Fig. 11, whereby the neutral flow line 154 is vented to the oil sump, this maintaining the function valve 68 in the intermediate position, wherein both traverse and feed oil are shut off. On the end of valve 142 is a stem 170, and when this stem is struck by a full length dog on the rotary control drum, the valve is shifted to its extreme left-hand position, which vents the traverse line 150, and thus shifts valve 68 to its lowermost position, wherein it permits the passage of low pressure or traverse oil to the carriage cylinder and return. When the valve 142 is pushed to an intermediate position by a half length dog on the drum, the feed line 152 is vented, and this raises valve 68 to its highest position, which cuts off the flow of low pressure or traverse oil, and permits the passage of high pressure or feed oil to the carriage cylinder and return.

At 97' I have shown in Fig. 1 a control device for alternately venting the ends of the chamber of the traverse oil by-pass valve 36, which is structurally identical with the direction valve control device 97, and is connected to opposite ends of the chamber of valve 36 by lines 171 and 172; the valve 36 itself being actuated by high pressure oil flowing through a pipe 173 connected into the high pressure flow line 45, and leading into a float valve 95' structurally similar to the float valve 95 already described and thence by lines 107' and 108' to the upper and lower ends of the chamber of valve 36. The valve of this control device 97' normally occupies a position to maintain the valve 36 in a position to open the by-pass through 38 to the sump (Fig. 6), but when the valve stem 174 thereof (Fig. 1) is forced inwardly by a dog on the rotary control drum, the by-pass valve 36 is actuated to close this by-pass; this occurring at a time when the lines from port 37 to the motivating cylinders of the slides are opened by one or more of the valves 68.

At 175 (Fig. 1) I have indicated diagrammatically a rotary indexing drum adapted to have adjustably mounted on the periphery thereof a plurality of dogs or cams such as 176 for actuating the stems of the direction control valves 97, and the by-pass control valve 97'. This drum also carries adjustable full and half length dogs or cams for actuating the stems of the function control valves 98. I have not illustrated this indexing drum and its operating mechanism in detail, since it is an old and well known device in automatic lathes; an example thereof being shown in Letters Patent to William L. Miller, No. 1,081,396, December 16, 1913, wherein the dogs or cams on the indexing drum actuate levers which throw into and out of operation certain mechanical devices for effecting traverse and feed movements of the turret and slide carriages and other movable members of the machine. The indexing drum and drum-actuating mechanism described in the said patent may be employed in the present system.

It is believed that the operation of the system and of its various component parts has already been set forth with sufficient detail to enable the same to be clearly understood without further description. It will also be understood that the structural details of many of the parts, such as the associated direction and function valves and their controlling devices may be widely varied within the operative principle of the system itself, and may be variously grouped or arranged to suit different installations of the system on various types of lathes and other machine tools designed to be operated by the system. The accumulator or emergency oil storage device forms a valuable adjunct of the system, which automatically comes into action whenever the demands of the machine operated by the system may possibly exceed the capacity of the high pressure pump, or when a quick movement of a part or parts is required. While I have herein shown the system as functioning only to effect quick traverse and feed movements of a turret and front and rear cross slides of a lathe, it is manifest that the operative principle of the system can readily be extended to actuate other moving parts of the machine, such, for instance, as the chuck jaws. The invention, therefore, in its broader aspects is not to be understood to be limited as to the specific details of structure and organization described and shown herein, but comprehends such variations, modifications and mechanical equivalents as fall within the spirit and purview of the appended claims.

I claim:

1. In a hydraulic power transmission system for lathes and like machines, the combination with a motor for actuating a movable member of the machine, of a low pressure oil pump, a high pressure oil pump, a retardant pump, associated direction and function valves, the former controlling the direction of flow of the motive fluid and the latter selecting and stopping the flow of the motive fluid, flow lines leading from said high and low pressure pumps into said function valve, flow lines leading from said direction valve to said motor, and a feed release flow line leading from said function valve to the intake side of said retardant pump.

2. In a hydraulic power transmission system for lathes and like machines, the combination with a motor for actuating a movable member of the machine, of a low pressure oil pump, a high pressure oil pump, a retardant pump, associated direction and function valves, the former controlling the direction of flow of the motive fluid and the latter selecting and stopping the flow of the motive fluid, flow lines leading from said high and low pressure pumps into said function valve, flow lines leading from said direction valve to said motor, a feed release flow line leading from said function valve to the intake side of said retardant pump, and a pressure equalizing device functioning to substantially equalize the pressures on the intake and discharge sides of said retardant pump.

3. In a hydraulic power transmission system for lathes and like machines, the combination with a motor for actuating a movable member of the machine, of an oil sump, a low pressure pump drawing oil from said sump, a high pressure pump drawing oil from said low pressure pump, associated fluid-actuated direction and function valves, the former controlling the direction of flow of the oil and the latter selecting and stopping the flow of oil, a low pressure flow line leading from said low pressure pump into said function valve, a high pressure flow line leading from said high pressure pump into said function valve, flow lines leading from said direction valve to said motor, a fluid-actuated by-pass valve in said low pressure flow line adapted, when the flow of low pressure oil to said motor is arrested by said function valve, to by-pass low pressure oil to said sump, control valves respectively controlling the actuating fluid of said direction, function, and by-pass valves, and automatic selective means for actuating said control valves.

4. In a hydraulic power transmission system for lathes and like machines, the combination with a motor for actuating a movable member of the machine, of a low pressure oil pump, a high pressure oil pump, a flow line connecting the discharge side of said low pressure pump with the intake side of said high pressure pump, a discharge line leading from said high pressure pump to said motor, and automatic means for arresting the flow of low pressure oil to said high pressure pump when a predetermined pressure has been reached in said discharge line, comprising a cut-off valve in said flow line, a spring normally holding said valve to open position, and means actuated by the high pressure fluid in said discharge line urging said valve to cut-off position against the urge of said spring.

5. In a hydraulic power transmission system for lathes and like machines, the combination with a motor for actuating a movable member of the machine, of a low pressure oil pump, a high pressure oil pump, a flow line connecting the discharge side of said low pressure pump with the intake side of said high pressure pump, a discharge line leading from said high pressure pump to said motor, and automatic means for arresting the flow of low pressure oil to said high pressure pump and causing the latter to idly circulate high pressure oil when a predetermined pressure has been reached in said discharge line, comprising an outwardly opening check valve in said flow line, a cut-off valve in said flow line beyond said check valve, a spring normally maintaining said cut-off valve in a position to pass low pressure oil through said flow line, and means actuated by the high pressure fluid in said discharge line operating to shift said cut-off valve to a position wherein it admits high pressure fluid against said check valve to hold the latter closed and also admits high pressure fluid into said flow line.

6. In a hydraulic power transmission system for lathes and like machines, the combination with a motor for actuating a movable member of the machine, of a low pressure oil pump, a high pressure oil pump, a flow line connecting the discharge side of said low pressure pump with the intake side of said high pressure pump, a discharge line leading from said high pressure pump to said motor, an accumulator for high pressure oil connected into said discharge line, means for arresting the flow of low pressure oil to said high pressure pump, and a valve-controlled air duct communicating with the intake side of said high pressure pump and normally rendered inoperative by the flow of said low pressure oil.

7. In a hydraulic power transmission system for lathes and like machines, the combination with a motor for actuating a movable member of the machine, of a low pressure oil pump, a high pressure oil pump, a flow line connecting the discharge side of said low pressure pump with the intake side of said high pressure pump, a discharge line leading from said high pressure pump to said motor, an accumulator for high pressure oil connected into said discharge line, an outwardly opening check valve in said flow line, a valve-controlled air duct communicating with said flow line at a point beyond said check valve, and means for locking said check valve in closed position whereby the flow of low pressure oil to said high pressure pump may be stopped, and said high pressure pump may be caused to pump air into said accumulator.

8. In a hydraulic power transmission system for lathes and like machines, the combination of an oil chamber, an oil pump connected on its intake side to said chamber, an accumulator, a flow line leading from the discharge side of said pump to said accumulator, means for causing said pump to pump air into said accumulator whereby to place the oil therein under pneumatic pressure, a flow line connecting said first-named flow line into said chamber, an air bleeder in said last-named flow line discharging into said chamber, and a cock in said last-named flow line adapted to be closed when charging said accumulator with air.

LOUIS E. GODFRIAUX.